United States Patent
Russo et al.

(10) Patent No.: US 12,259,257 B2
(45) Date of Patent: Mar. 25, 2025

(54) MAP UPDATE USING IMAGES

(71) Applicant: Micron Technology, Inc., Boise, ID (US)

(72) Inventors: Kathryn H. Russo, Boise, ID (US); Aparna U. Limaye, Boise, ID (US); Gurtaranjit Kaur, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 321 days.

(21) Appl. No.: 17/557,897

(22) Filed: Dec. 21, 2021

(65) Prior Publication Data

US 2023/0194304 A1 Jun. 22, 2023

(51) Int. Cl.
*G01C 21/00* (2006.01)
*G01C 21/32* (2006.01)
*G06N 20/00* (2019.01)
*H04W 4/44* (2018.01)

(52) U.S. Cl.
CPC ......... *G01C 21/3841* (2020.08); *G01C 21/32* (2013.01); *G01C 21/3874* (2020.08); *G01C 21/3885* (2020.08); *G06N 20/00* (2019.01); *H04W 4/44* (2018.02)

(58) Field of Classification Search
CPC .......... G01C 21/3841; G01C 21/32; G01C 21/3874; G01C 21/3885; G01C 21/3859; G06N 20/00; H04W 4/44
See application file for complete search history.

(56) References Cited

U.S. PATENT DOCUMENTS

| | | | |
|---|---|---|---|
| 10,198,001 B2* | 2/2019 | Shashua | G01S 5/16 |
| 10,331,124 B2* | 6/2019 | Ferguson | G06V 20/582 |
| 11,194,847 B2 | 12/2021 | Anirudh | |
| 11,195,413 B1 | 12/2021 | Dongzhe et al. | |
| 2020/0191601 A1* | 6/2020 | Jiang | G01C 21/3859 |
| 2021/0004363 A1* | 1/2021 | Bailly | G06T 17/05 |
| 2021/0281968 A1* | 9/2021 | Kurehashi | G08G 1/091 |
| 2021/0381849 A1 | 12/2021 | Yuval et al. | |
| 2021/0382478 A9 | 12/2021 | Nan | |
| 2021/0383115 A1 | 12/2021 | Emil et al. | |
| 2021/0383687 A1 | 12/2021 | Leon et al. | |
| 2022/0110134 A1* | 4/2022 | Wang | H04W 72/56 |
| 2023/0091924 A1* | 3/2023 | Dowdall | G01S 7/4808 |
| | | | 701/26 |

* cited by examiner

*Primary Examiner* — Adam R Mott
*Assistant Examiner* — Heather J Keniry
(74) *Attorney, Agent, or Firm* — Brooks, Cameron & Huebsch, PLLC

(57) ABSTRACT

Methods and apparatuses associated with updating a map using images are described. An apparatus can include a processing resource and a memory resource having instructions executable to a processing resource to monitor a map including a plurality of locations, receive, at the processing resource, the memory resource, or both, and from a first source, image data associated with a first location, identify the image data as being associated with a missing portion, an outdated portion, or both, of the map, and update the missing portion, the outdated portion, or both, of the map with the image data.

17 Claims, 5 Drawing Sheets

MAP UPDATE USING IMAGES

TECHNICAL FIELD

The present disclosure relates generally to apparatuses, media, and methods associated with a map update using images.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can be used to transmit information to users via a display to view images and/or text, speakers to emit sound, and/or a sensor to collect data. A computing device can receive inputs from sensors on or coupled to the computing device. The computing device can be coupled to a number of other computing devices and can be configured to communicate (e.g., send and/or receive data) with the other computing devices and/or to a user of the computing device.

DETAILED DESCRIPTION

Figure 1:
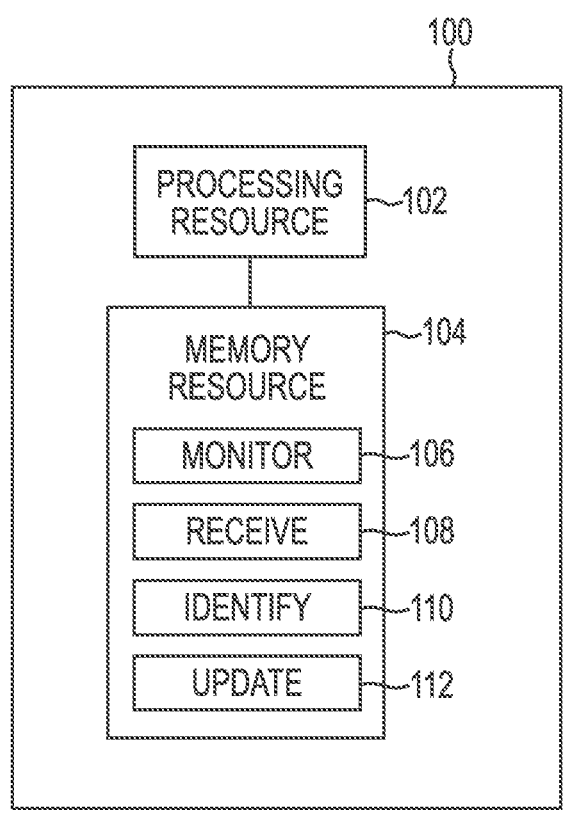
FIG. 1 is a diagram representing an apparatus including a processing resource and a memory resource in accordance with a number of embodiments of the present disclosure.

Apparatuses, media, and methods associated with updating a map using images are described. The map can be created and updated using images from a plurality of sources including, for instance, autonomous vehicles and associated sensors. For example, images collected from autonomous vehicles can be used create and update the map. Examples of the present disclosure can also determine images that may be missing from the map and request images from the autonomous vehicles and/or search a database (e.g., cloud storage) for images that address the missing portions. Image comparison can be used to identify changes over time to particular locations of the map.

Examples of the present disclosure allow for the creation and near-continuous updating of the map. For instance, the map can be updated periodically (e.g., every 10 minutes, every hour, every day, etc.), and/or as new images are received. Images can include metadata such as location, heading, etc. that can be used to identify which images match missing or outdated portions of the map. Once identified, the map can be updated. Image comparison for particular locations and views may be used to identify changes to the particular locations over time. Those changes can be used, for instance, to provide alerts to drivers, emergency services, or others. For instance, traffic changes, flooding, or infrastructure changes in particular locations may be determined, and alerts may be provided.

In some examples, the changes, along with image data from a plurality of different sources (e.g., different autonomous vehicles) can be used to update the map and determine an extent of an issue detected, such as flooding, a fire, traffic issues, etc., and such an analysis and/or determination can be used to determine areas of higher risk or to identify a source of an issue (e.g., leaking pipe causing flood), which can improve response times as compared to other approaches that mosaic static images without analysis, and do not fluidly update the map.

Examples of the present disclosure can include an apparatus comprising a processing resource and a memory resource in communication with the processing resource having instructions executable to monitor a map including a plurality of locations, and receive, at the processing resource, the memory resource, or both, and from a first source, image data associated with a first location. The instructions can be executable to identify the image data as being associated with a missing portion, an outdated portion, or both, of the map, and update the missing portion, the outdated portion, or both, of the map with the image data.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 100 can reference element "00" in FIG. 1, and a similar element can be referenced as 200 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a diagram representing an apparatus 100 including a processing resource 102 and a memory resource 104 in accordance with a number of embodiments of the present disclosure. The memory resource 104 can be in communication with the processing resource 102, and the memory resource 104 may have instructions written thereon. The apparatus 100, in some examples, can include a controller, such as a microcontroller. The processing resource 102, the memory resource 104, or both, may be part of the controller or separate from the controller.

In some examples, the apparatus 100 can utilize artificial intelligence (AI) and associated machine learning models to determine and update instructions associated with performance of the apparatus 100. AI, as used herein, includes a controller, computing device, or other system to perform a task that normally requires human intelligence. For instance, the controller, processing resource 102, memory device 104 or any combination thereof can perform a task (e.g., updating a map using images) that normally requires human intelligence. In some examples, the apparatus 100 can act as a local source of processing and storage while sending data to cloud storage or to sources in communication with the apparatus 100.

The apparatus 100, in some examples, may be in communication with a sensor or sensors (not illustrated in FIG. 1) associated with the sources (e.g., autonomous vehicles). For example, the memory resource 104 of the apparatus 100 may be in communication with the sensor or sensors. Example sensors may include cameras or other image sensors, temperature sensors, location sensors (e.g., GPS or other location monitor), depth sensors, particle/smoke sensors, or battery sensors, among others.

At 106, the processing resource 102 can execute instructions to monitor a map including a plurality of locations. For instance, the map can be monitored for missing or outdated images, low quality images, and low detail images, as well as changes over time with respect to the images and/or particular locations. An image may be considered outdated, for instance, if an updated image has not been added to the map within a threshold period of time (e.g., 10 minutes, 1 hour, 1 day, 1 month, etc.).

At 108, the processing resource 102 can execute instructions to receive, at the processing resource 102, the memory resource 104, or both, and from a first source, image data associated with a first location. The image data, for instance, can include images gathered by the first source, which can include an autonomous vehicle and/or an associated sensor (e.g., camera, heat sensor, etc.) in communication with the autonomous vehicle. The image data can also include metadata that can include physical location data (e.g., address, GPS data, etc.), viewing direction data (e.g., a camera facing a particular direction), etc. to identify a location of the image (e.g., the first location).

An autonomous vehicle can include a vehicle capable of sensing its environment and operating without human involvement. This can be achieved using a plurality of sensors, actuators, algorithms, machine learning systems, and processors to execute instructions. Autonomous vehicles can maintain an awareness of their surroundings based on these sensors situated in different parts of the vehicle. Radar sensors can monitor the position of nearby vehicles, video cameras can detect traffic lights, read road signs, track other vehicles, and look for pedestrians. Lidar (light detection and ranging) sensors can bounce pulses of light off the vehicle's surroundings to measure distances, detect road edges, and identify lane markings. Ultrasonic sensors in the wheels can detect curbs and other vehicles when parking.

An autonomous vehicle may utilize Decentralized Environmental Notification Messages (DENM), Intelligent Transport Systems (ITS), Cooperative Awareness Messages (CAM), and vehicle-to-everything (V2X) communication, among other communication systems. This messaging can allow for autonomous vehicles to share information, and these communication systems can be utilized when receiving image data from the autonomous vehicles to update the map with real-time image and other data. DENM is a system that utilizes event-related messages related to possible hazards, ITS is a centralized system for managing traffic through multiple V2X communication applications including vehicle and infrastructure communication, and CAM is a system that regularly broadcasts messages from vehicles that communicate their status.

In an example, a first autonomous vehicle may provide image data indicating water on a roadway in a particular location. A second autonomous vehicle may provide image data ten minutes later indicating deeper water on the roadway. Examples herein can analyze that image data and determine the roadway is flooded. Alerts can be sent out, for instance, to other autonomous vehicles, emergency services, etc. Example alerts may be in the form of emails, text messages, alerts via an application, alerts directly to a vehicle or emergency services, etc.

Such examples can use a machine learning model, for instance to track changes over time and identify issues with particular locations of the map, among others. In some instance, the machine learning model associated with the map can be updated in response to receipt of the image data associated with the first location. For instance, the image data may include a new building, which can result in an update to the machine learning model such that the new building is considered in future updates, alerts, etc.

At 110, the processing resource 102 can execute instructions to identify the image data as being associated with a missing portion, an outdated portion, or both, of the map, and at 112, the processing resource 102 can execute instructions to update the missing portion, the outdated portion, or both, of the map with the image data. For instance, using metadata associated with the image data (e.g., heading information, location, time, etc.), a determination can be made that image data received includes the location and particular images that address the missing and/or outdated portion. Put another way, the image data can be identified as being associated with the missing portion, the outdated portion, or both, by matching the metadata associated with the image data with location and viewing direction data associated with the missing portion, the outdated portion, or both.

For instance, if the map includes an image of a building taken more than a threshold time in the past (e.g., 10 minutes ago), this area of the map may be considered outdated, and it can be replaced with a new image having matching metadata. In some examples, the request is made to the plurality of sources, along with a search of a database (e.g., cloud storage) for images previously gathered by sources. A prompt, in some instances, can provided to computing devices such as nearby mobile devices (e.g., within a threshold distance) to collect an image if it's outdated beyond the threshold time. In some instances, this request to surrounding devices may be performed in addition to or alternatively to requesting images that are already captured from autonomous vehicles or other passive image collection.

In some examples, the map can be updated as new image data associated with the first location is received, whether or not the new image data addresses a missing or outdated area. For instance, the map may be updated each time new image data associated with the first portion or another portion of the map is received. In addition, as new image data is received, continued determinations of whether or not the new image data addresses missing or outdated areas can be made. Changes to the first location or other locations can be detected based on the map updates and new image data received. For instance, the new building, or any construction progress may be detected as a change.

In some examples, the map can be updated and a timelapse version of the map can be created as new image data associated with the particular location and the plurality of locations is received. For instance, as the new building is built, a timelapse version of the map can be created. In a flooding example, such a timelapse version may allow for analysis of how and where flooding occurs, which can be used to plan for future flooding, prevention, response, and/or recovery.

Figure 2:
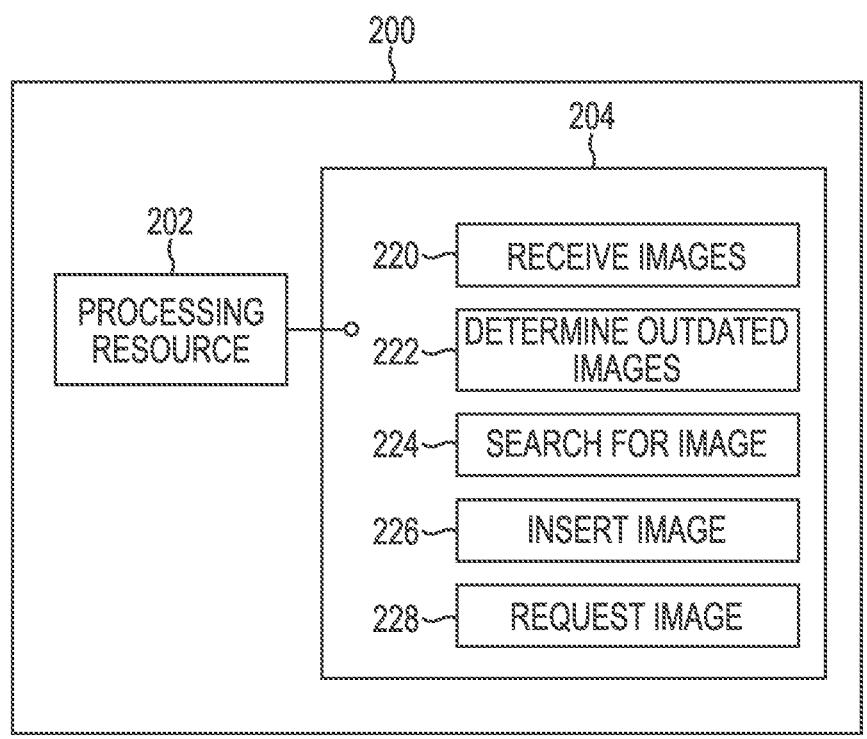
FIG. 2 is a functional diagram representing a processing resource in communication with a memory resource having instructions written thereon in accordance with a number of embodiments of the present disclosure.

FIG. 2 is a functional diagram representing a processing resource 202 in communication with a memory resource 204 having instructions 220, 222, 224, 226, 228 written thereon in accordance with a number of embodiments of the present disclosure. In some examples, the processing resource 202 and the memory resource 204 comprise an apparatus 200 such as the apparatus 100 illustrated in FIG. 1. In some examples, the processing resource 202 and the memory resource 204 comprise a microcontroller.

The apparatus 200 illustrated in FIG. 2 can be a server or a computing device (among others) and can include the processing resource 202. The apparatus 200 can further include the memory resource 204 (e.g., a non-transitory MRM), on which may be stored instructions, such as instructions 220, 222, 224, 226, 228. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 204 may be electronic, magnetic, optical, or other physical storage device that stores executable instructions. Thus, the memory resource 204 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 204 is a non-transitory MRM comprising Random Access Memory (RAM), an Electrically-Erasable Programmable ROM (EEPROM), a storage drive, an optical disc, and the like. The memory resource 204 may be disposed within a controller (e.g., microcontroller) and/or computing device. In this example, the executable instructions 220, 222, 224, 226, 228 can be "installed" on the device. Additionally, and/or alternatively, the memory resource 204 can be a portable, external or remote storage medium, for example, that allows the system to download the instructions 220, 222, 224, 226, 228 from the portable/external/remote storage medium. In this situation, the executable instructions may be part of an "installation package". As described herein, the memory resource 204 can be encoded with executable instructions associated with updating a map using images.

The instructions 220, when executed by a processing resource such as the processing resource 202 can include instructions to receive, at the processing resource 202, the memory resource 204, or both, a first plurality of images from a plurality of sources. The plurality of sources, for instance, can include autonomous vehicles and/or their associated sensors that gather images and other data as they travel. The images and/or other data can be received, which may include gathering the images from cloud storage. The images can include metadata, which can include more precise and specific location and other data.

The instructions 222, when executed by a processing resource such as the processing resource 202, can include instructions to determine, at the processing resource 202, the memory resource 204, or both, a second plurality of images of a map monitored by the processing resource 202, the memory resource 204, or both, that have not been updated within a particular time period. For instance, it can be determined that portions of the map, including the second plurality of images, have not been updated within a threshold amount of time. For instance, a list could be updated that lists images that are missing from a recent specified period of time (e.g., 10 minutes).

The instructions 224, when executed by a processing resource such as the processing resource 202, can include instructions to search the first plurality of images and a database of previously received images for the second plurality of images of the map. In some examples, the memory resource 204 may be the database of previously received images and/or may be searched in addition to the database. For instance, using the list, a search may be undertaken for the images needing updating. In some examples, the list or a different list may include areas of poor quality or missing from the map, and images could be searched for that may address those areas of the map.

The instructions 226, when executed by a processing resource such as the processing resource 202, can include instructions to insert one of the second plurality of images into the map in response to finding an image matching one of the second plurality of images. For instance, images from autonomous vehicles using V2X technology (e.g., via ITS, DENM, or other V2X communication) can be received, and the images can include metadata to help identify which images are matches. Once an image is found that meets criteria for the outdated image, it can be added to the map.

The instructions 228, when executed by a processing resource such as the processing resource 202, can include instructions to request, from the plurality of sources, the image matching one of the second plurality of images in response to not finding a matching image. A request may be an alert to sources in the area of the matching image, or it may be a search of a database or cloud storage for the matching image. A matching image may meet particular criteria, for instance, matching a portion or all of the metadata associated with the missing, outdated, or other image. For instance, matching location coordinates and a particular camera view within a threshold angle may be matching criteria.

In some examples, instructions can be executable to determine a change between the matching image and the one of the second plurality of images. For instance, image comparison for particular locations and views can be used to identify changes over time, in some examples. Because of the V2X specific location data (e.g., within the metadata), small segments of images can be stitched or matrixed together with greater detail as compared to other mapping programs.

The plurality of sources can be alerted of the change, and in some examples, the plurality of sources can be instructed to share the change with different sources in which the plurality of sources is in communication. In some instances, a party outside of the plurality of sources may be alerted of the change. For instance, an image may be received indicating a car crash that has shut down a roadway. This can be identified as a change from a previous image (e.g., no crash, no slowdown, etc.). Speed reductions of multiple vehicles may also be considered. An alert can be sent to the plurality of sources, so the area can be avoided and/or sources in the area can provide new, updated images from the area. The sources may be instructed to share the information with other sources (e.g., other automated vehicles) so they are aware and/or can avoid the area. In some examples, emergency services can be alerted of the change, so help can be sent to the crash site. Such changes can be used to update the map, for instance using machine learning. For instance, new or updated images from any or all of the sources can be saved in the memory resource 204 or cloud storage, and a machine learning model can self-learn to update and improve accuracy of the map.

Figure 3:
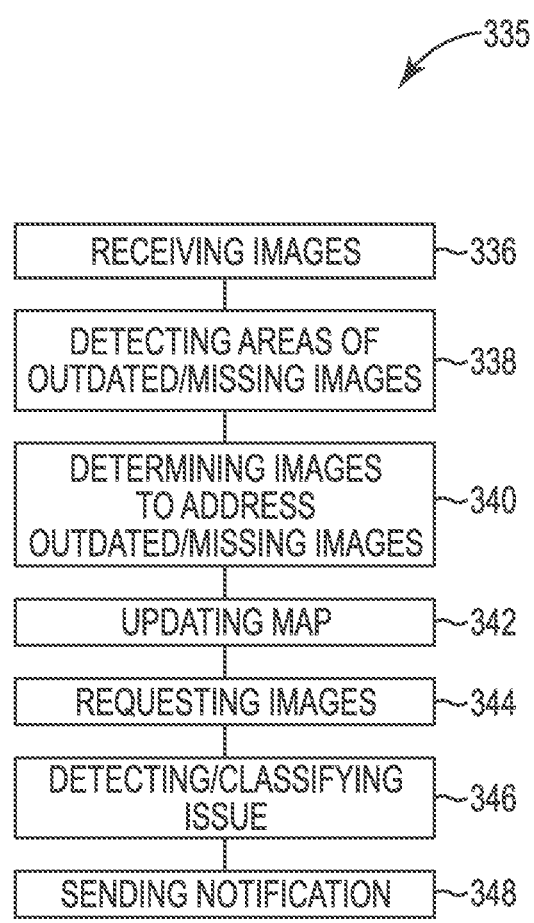
FIG. 3 is a flow diagram representing an example method associated with updating a map using images in accordance with a number of embodiments of the present disclosure.

FIG. 3 is a flow diagram representing an example method 335 associated with updating a map using images in accordance with a number of embodiments of the present disclosure. The method 335 may be performed using apparatus 100 or apparatus 200, as provided in FIG. 1 and FIG. 2, respectively.

At 336, the method 335 can include receiving, at a processing resource, a memory resource, or both, a plurality of images including location and time metadata from sensors associated with a plurality of vehicles that utilize vehicle-to-everything (V2X) communication. As the plurality of vehicles travels, each vehicle captures images that can be received and stored at the memory resource. In some examples, images may be uploaded to cloud storage, from where they are retrieved.

The method 335, at 338, can include detecting, at the processing resource, areas of a map having an outdated image, a missing image, or both. For instance, locations that have not received images in a particular amount of time can be flagged. Similar, missing locations or viewing angles (e.g., camera angles) may be flagged.

At 340, the method 335 can include determining whether one of the plurality of received images addresses the outdated image, the missing image, or both based on the metadata. For instance, as images are received from the vehicles, which can happen near-continuously (e.g., as the vehicles travel), the metadata of the images can be compared to metadata associated with missing images, outdated images, or poor-quality images. A match can be made (e.g., the image addresses the outdated/missing image) when a threshold amount of the metadata matches between the images, and at 342, the method 335 can include updating the map using the one of the plurality of images in response to determining the one of the plurality of received images addresses the outdated image, the missing image, or both.

The method 335, at 344, can include requesting, from the plurality of sources, a matching one of the second plurality of images in response to not finding an image to address the outdated image, the missing image, or both. The request can be made to plurality of sources directly, or in some instances, a request can be made from a database of images uploaded from a plurality of autonomous vehicles, for the matching one of the second plurality of images in response to not finding an image to address the outdated image, the missing image, or both. The map can be updated if a match is found in response to the request.

Some examples can include determining periodic updates associated with the particular location and storing to the memory resource, a database, or both, the periodic updates. For instance, periodic updates associated with images of a bridge may be determined and stored. The periodic updates may include changes to the bridge over time and potential structural issues. Other updates may include traffic updates at particular times of the day, potential flood zones, or other locations that may benefit from periodic and accessible updates. In some instances, alerts or updates may be scheduled, such that an alert is sent about a particular location consistently (e.g., a city engineer is sent a bridge update each day).

At 346, the method 335 can include detecting and classifying, by the processing resource and based on the updated map, an issue associated with a particular location on the map. The issue, for instance, may include a change between images having the same or similar metadata (e.g., old vs. new image) such as a change in a structure, a road condition change, and/or an environmental change, among others. The issue may also include weather changes and/or disasters (e.g., fire, floods, earthquakes, etc.). The classification can include a determination of what the issue is, such as a fire, earthquake, flood, road damage, traffic slowdown, etc.

An issue such as an impact from a disaster can be detected in real-time, allowing first responders to prioritize areas in need of help. For example, with respect to fires, emergency crews can use the map and image data to identify a source of the fire or when smoke was detected using images received over time and/or timelapse versions of the map. Smoke detection may be determined as an issue before first responders are alerted, for instance. Building damage (e.g., from the outside) may be assessed, in some instances, by comparing dimensions from previous images. Similar, earthquakes may be detected or investigated and data gathered based on before and after maps including images of collapsed or other damaged infrastructure.

In another example, floods may be monitored or detected using landmark comparison between previous (e.g., unflooded) images and new images. Flooding depth may be projected, and the information provided to emergency responders for use in prioritizing areas of concern. This data can be sent to the plurality of vehicles to alert them of disasters such as flooding, in some examples.

For instance, at 348, the method 335 can include sending a notification to the sensors of the plurality of vehicles and additional vehicles based on the detected and classified issue. This can alert the plurality of vehicles to avoid an area (e.g., traffic issues, flooding, fire, etc.) and adjust their routes. Alerts may also be sent to first responders based on the detected and classified issue.

In some examples, DENM signals can be received from the sensors of the plurality of sources, and the DENM signals can be classified. DENM alerts can be provided to an ITS based on the classified DENM signals. For instance, corroborated imagery of an issue from a plurality of vehicles may be used to confirm a magnitude and extent of the issue. For example, a first vehicle may detect water on a road, but does not classify it as a flood, a puddle, rain, etc. However, using images and DENM signals from other vehicles, a classification can be made, and the first vehicle can be sent feedback on whether the event has been classified as a puddle, flood, etc., and in response, the first vehicle can communicate through DENM alerts to the ITS and other vehicles the extent of the issue.

An example of reclassification can include, for instance multiple V2X sites (e.g., cars, intersections, etc.) can send a DENM message indicating a puddle. An ITS can collect multiple DNM messages and check with map alerts for a correct classification (e.g., flooding). This updated image classification and DENM message can be sent to the vehicles that sent the initial DENM message and can include classifications that alter outcomes (e.g., routes). Another example can include, for instance, direct map classifier communications with V2X that can help to generate properly classified DENM messages to the ITS.

Figure 4:
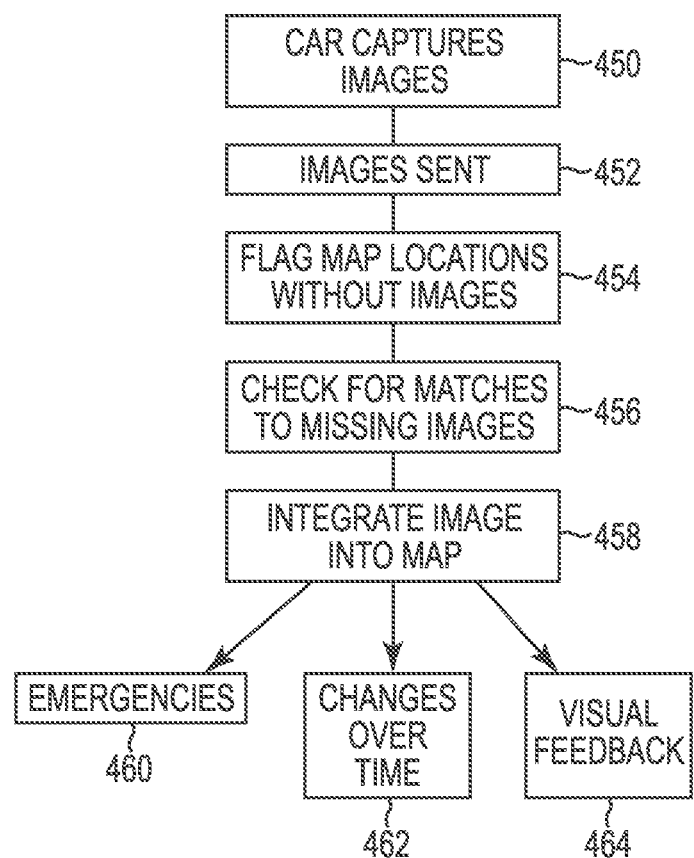
FIG. 4 is another flow diagram representing an example method associated with updating a map using images in accordance with a number of embodiments of the present disclosure.

FIG. 4 is another flow diagram representing an example method associated with updating a map using images in accordance with a number of embodiments of the present disclosure. The example illustrated in FIG. 4 includes an autonomous vehicle ("car") collecting image data using sensors.

At 450, the car is traveling down a roadway and capturing images as it travels. The time it is traveling, as well as location information, camera angle information, max image depth information, alert information, and other metadata are collected and kept with the captured images. Additional images may be captured by other vehicles or infrastructure such as traffic cameras, security camera, etc.

At 452, the images and their associated metadata can be sent to cloud storage for later use. At 454, locations on the map that have not received images in a threshold period of time can be flagged, as well as areas of the maps with missing images or camera angles. At 456, the cloud storage and other V2X communications are checked for images that match the missing and/or desired images based on the metadata. At 458, a matching, updated image found during the search is integrated into the map.

The map including the updated image can be used in a number of ways, including to assist in classification and/or validation of emergencies at 460, to capture changes in the map over time at 462, and to provide visual feedback at 464, for instance with respect to water or snow depth on a road, infrastructure conditions (e.g., potholes), traffic conditions, and/or road closures, among others.

In some examples, the classification and/or validation of emergencies at 460 can include receiving or retrieving images from similar locations with similar metadata from multiple vehicles, comparing the images, and classifying the images as depicting an emergency. For instance, one vehicle may detect smoke and upload and image, but not classify it as a fire. A second vehicle two minutes later may also detect the smoke and upload the image, but the smoke is thicker and darker in this image. A third vehicle may detect heavy, black smoke and upload the image, along with metadata indicating an emergency. Analysis of the three images together may result in a validation of the emergency of the third vehicle and classification of the first and second images as emergencies. This emergency classification/validation can be sent to other vehicles and/or first responders, in some examples.

Figure 5:
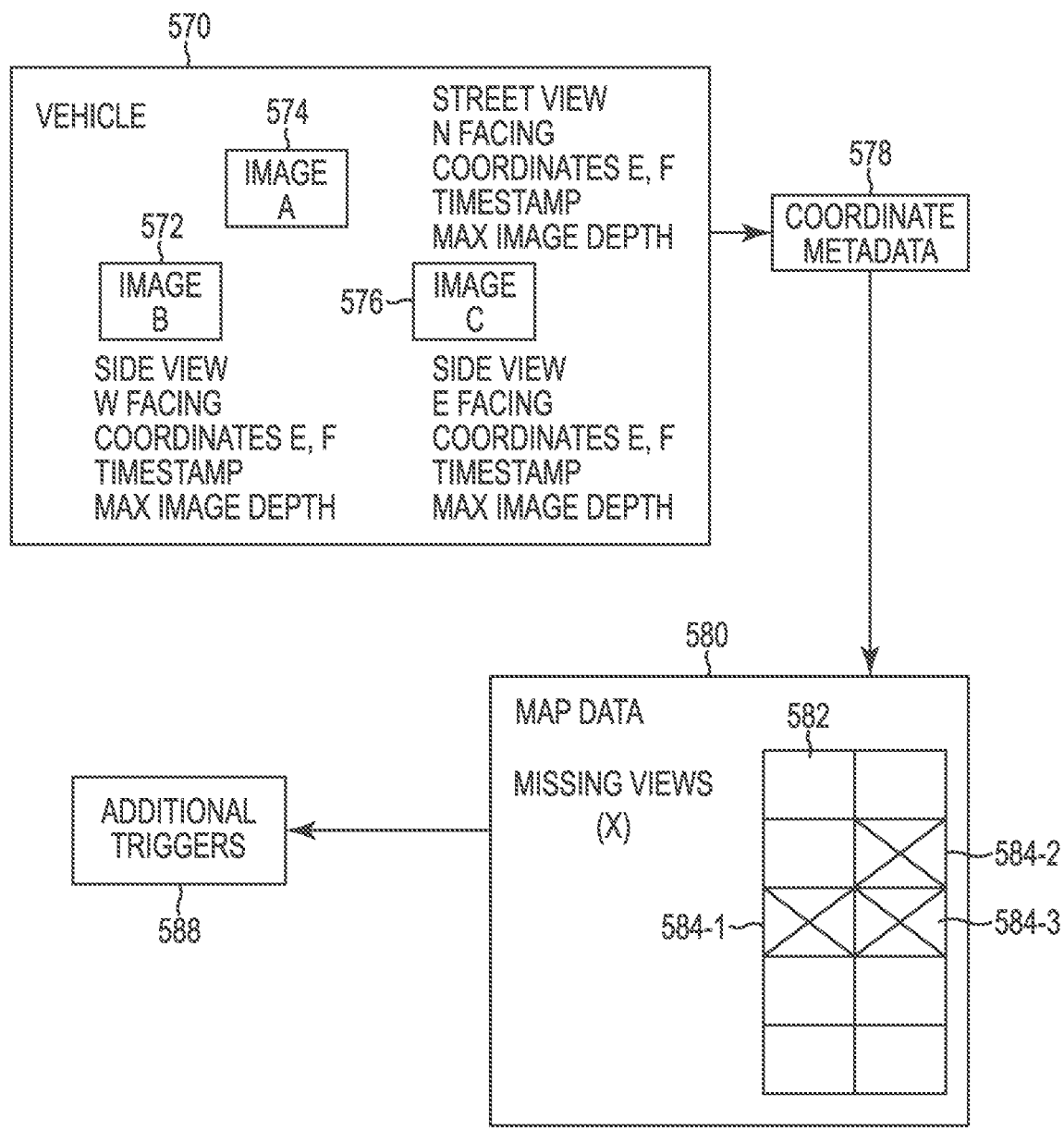
FIG. 5 is yet another flow diagram representing an example method associated with updating a map using images in accordance with a number of embodiments of the present disclosure.

FIG. 5 is yet another flow diagram representing an example method associated with updating a map 582 using images in accordance with a number of embodiments of the present disclosure. In the example illustrated in FIG. 5, a vehicle 570 captures multiple images as the vehicle 570 travels.

Image A 574, Image B 572, and Image C 576 each includes metadata indicating a view and direction, location coordinates, a timestamp, and a maximum image depth. The images (e.g., V2X images) 574, 572, 576 can be uploaded to cloud storage and/or received by a device such as device 100 or device 200 as illustrated in FIGS. 1 and 2, wherein the metadata is compared and coordinated with missing, outdated, or other desired images of the map 582 at 578. If the metadata matches any of the missing views 584-1, 584-2, 584-3, the images are imported and added to the map 582 at 580.

At 588, changes can be detected that result in addition triggers. For instance, a determination may be made that a telephone pole is missing from one image to the next or that water is on the road, which may trigger an alert to other vehicles to confirm the change (e.g., a downed pole, depth of water, etc.). Other triggers may include DENM alerts, contacting first responders, or initiating recording of event times or time periods. For instance, in the water example, a calculation for depth of water can be made based on different images from the same vehicle 570, from different vehicles, and/or from landmark comparisons on old and new images. A message may be sent through DENM with respect to whether or not a street could be driven on, what the water depth is, and/or what size vehicle could drive through the water. First responders may receive an alert that can aid in prioritization of areas with higher risks.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a processing resource; and
a memory resource in communication with the processing resource having instructions executable to:
monitor a map including a plurality of locations;
receive, at the processing resource, the memory resource, or both, and from a first source associated with a plurality of vehicles that utilize vehicle-to-everything (V2X) communication, first image data having metadata indicating camera viewing direction data, physical location data, location coordinates, a timestamp, and a maximum image depth associated with a first location;
identify a portion of the first image data as matching a missing portion, an outdated portion, or both, of the map, wherein the portion of the first image data includes matching location coordinates and a camera view within a threshold angle;
update the missing portion, the outdated portion, or both, of the map with the portion of the first image data;
in response to not finding the matching portion of the first image data:
request, from the first source the image matching the missing portion, the outdated portion, or both; and
request from a second source having physical location metadata located within a threshold distance of the physical location data metadata of at least portion of the first image data, the image matching the missing portion, the outdated portion, or both;
detect and classify, based on the updated map, an additional change between the first location and the first image data;
trigger an alert to confirm the additional change;
identify a source of the missing portion, the outdated portion, the additional change, or a combination thereof; and
identify an area of risk associated with the updated map based on the identified source of the missing portion, the outdated portion, the additional change, or a combination thereof.

2. The apparatus of claim 1, wherein the instructions are executable to identify the first image data as being associated with the missing portion, the outdated portion, or both, by matching the metadata associated with the image data with location and viewing direction data associated with the missing portion, the outdated portion, or both.

3. The apparatus of claim 1, further comprising the instructions executable to update a machine learning model associated with the map in response to receipt of the image data associated with the first location.

4. The apparatus of claim 1, wherein the first source is a sensor in communication with an autonomous vehicle.

5. The apparatus of claim 1, further comprising instructions executable to update the map as new image data associated with the first location is received.

6. The apparatus of claim 5, further comprising instructions executable to detect changes to the first location based on the map update and the new image data received.

7. The apparatus of claim 1, further comprising instructions executable to update the map and create a time-lapse version of the map as new image data associated with the particular location and the plurality of locations is received.

8. A non-transitory machine-readable medium comprising a processing resource in communication with a memory resource having instructions executable to:
receive, at the processing resource, the memory resource, or both, a first plurality of images from a first plurality of sources having sensors associated with a plurality of vehicles that utilize vehicle-to-everything (V2X) communication, each one of the first plurality of images having metadata indicating camera viewing direction data, physical location data, location coordinates, a timestamp, and a maximum image depth associated with a location;
determine, at the processing resource, the memory resource, or both, a second plurality of images of a map monitored by the processing resource, the memory resource, or both, that have not been updated within a particular time period;
search the first plurality of images and a database of previously received images for the second plurality of images of the map;
in response to finding an image matching one of the second plurality of images, insert the one of the second plurality of images into the map,
wherein the image matching one of the second plurality of images includes matching location coordinates and a camera view within a threshold angle;
in response to not finding a matching image:
request, from the first plurality of sources the image matching one of the second plurality of images; and
request from a second plurality of sources having physical location metadata located within a threshold distance of the physical location data metadata of at least one of the first plurality of images, the image matching one of the second plurality of images;
determine a change between the matching image from the first plurality of sources or the second plurality of sources and the one of the second plurality of images;
identify a source of the change; and
identify an area of risk associated with the map based on the identified source of the change.

9. The medium of claim 8, further comprising the instructions executable to alert the plurality of sources of the change.

10. The medium of claim 9, further comprising the instructions executable to instruct the plurality of sources to share the change with different sources in which the plurality of sources is in communication.

11. The medium of claim 8, further comprising the instructions executable to alert a party outside of the plurality of sources of the change.

12. A method, comprising:
receiving, at a processing resource, a memory resource, or both, a plurality of images including location and time metadata from sensors associated with a plurality of vehicles that utilize vehicle-to-everything (V2X) communication,
wherein the location and time metadata comprises camera viewing direction data, physical location data, location coordinates, a timestamp, and a maximum image depth;
detecting, at the processing resource, areas of a map having an outdated image, a missing image, or both;
determining whether one of the plurality of received images addresses the outdated image, the missing image, or both based on the metadata;

in response to determining the one of the plurality of received images addresses the outdated image, the missing image, or both, updating the map using the one of the plurality of images, wherein the one of the plurality of received images includes matching location coordinates and a camera view within a threshold angle;

in response to not finding an image to address the outdated image, the missing image, or both:
  requesting, from the sensors, a matching one of the plurality of received images and;
  request from a different sensor having physical location metadata located within a threshold distance of the physical location data metadata of at least one of the plurality of received images, the image matching one of the plurality of received images;

detecting and classifying, by the processing resource and based on the updated map, an issue associated with a particular location on the map;

identifying a source of the issue;

identifying an area of risk associated with the map based on the identified source of the issue; and sending a notification to the sensors of the plurality of vehicles and additional vehicles based on the detected and classified issue.

13. The method of claim 12, further comprising receiving Decentralized Environmental Notification Message (DENM) signals from the sensors of the plurality of sources and classifying the DENM signals.

14. The method of claim 13, further comprising providing DENM alerts to an Intelligent Transport System (ITS) based on the classified DENM signals.

15. The method of claim 12, further comprising:
  determining periodic updates associated with the particular location; and
  storing to the memory resource, a database, or both, the periodic updates.

16. The method of claim 12, wherein detecting the issue comprises detecting a change in a structure associated with the particular location.

17. The method of claim 12, wherein detecting the issue comprises detecting a road condition change associated with the particular location.

* * * * *